(12) United States Patent
Ericksen

(10) Patent No.: US 6,568,610 B1
(45) Date of Patent: May 27, 2003

(54) FLEXIBLE LAWN AND GARDEN SPRAY WAND

(76) Inventor: K. C. Ericksen, 512 E. 325 North, Centerville, UT (US) 84014

( * ) Notice: Subject to any disclaimer, the term of this patent is extended or adjusted under 35 U.S.C. 154(b) by 0 days.

(21) Appl. No.: 09/638,387

(22) Filed: Aug. 12, 2000

(51) Int. Cl.$^7$ ............................................. B05B 15/08
(52) U.S. Cl. ................ 239/588; 239/587.1; 138/DIG. 8
(58) Field of Search ............................ 239/588, 587.1, 239/280, 280.5; 138/DIG. 8, 118, 121

(56) References Cited

U.S. PATENT DOCUMENTS

| | | | | |
|---|---|---|---|---|
| 1,219,049 A | * | 3/1917 | Sticklin | 239/588 |
| 2,759,765 A | * | 8/1956 | Pawley | 239/588 |
| 2,873,999 A | * | 2/1959 | Webb | 239/588 |
| 3,023,971 A | * | 3/1962 | Milhous | 239/588 |
| 3,032,357 A | * | 5/1962 | Shames et al. | 138/DIG. 8 |
| 4,307,754 A | * | 12/1981 | Muratsubaki | 138/DIG. 8 |
| 4,327,775 A | * | 5/1982 | Tally | 138/DIG. 8 |
| 5,894,866 A | * | 4/1999 | Horst et al. | 138/DIG. 8 |

* cited by examiner

*Primary Examiner*—Michael Mar
*Assistant Examiner*—Dinh Q. Nguyen
(74) *Attorney, Agent, or Firm*—Mallinckrodt & Mallinckrodt; Robert R. Mallinckrodt

(57) ABSTRACT

A flexible water spray wand for connection to a standard garden hose, having a housing connectable at a lower end to the garden hose and at an upper end to a flexible tube assembly connected at an opposite end to a spray nozzle. The pistol grip housing includes a water flow control valve such as a trigger mechanism operatively connected to a water valve for controlling the flow of water from the nozzle of the wand. The flexible tube assembly includes a flexible outer ribbed tube and an inner flexible tube for carrying the water, each connected to the handle and the nozzle by fittings. The position of the flexible tube assembly is held by a bendable metal rod which extends therethrough so as to enable the flexible tube assembly to be bent such that the water spray wand directs the water as desired to reach non-readily accessible places such as overhead plants and for flushing leaves from gutters.

9 Claims, 3 Drawing Sheets

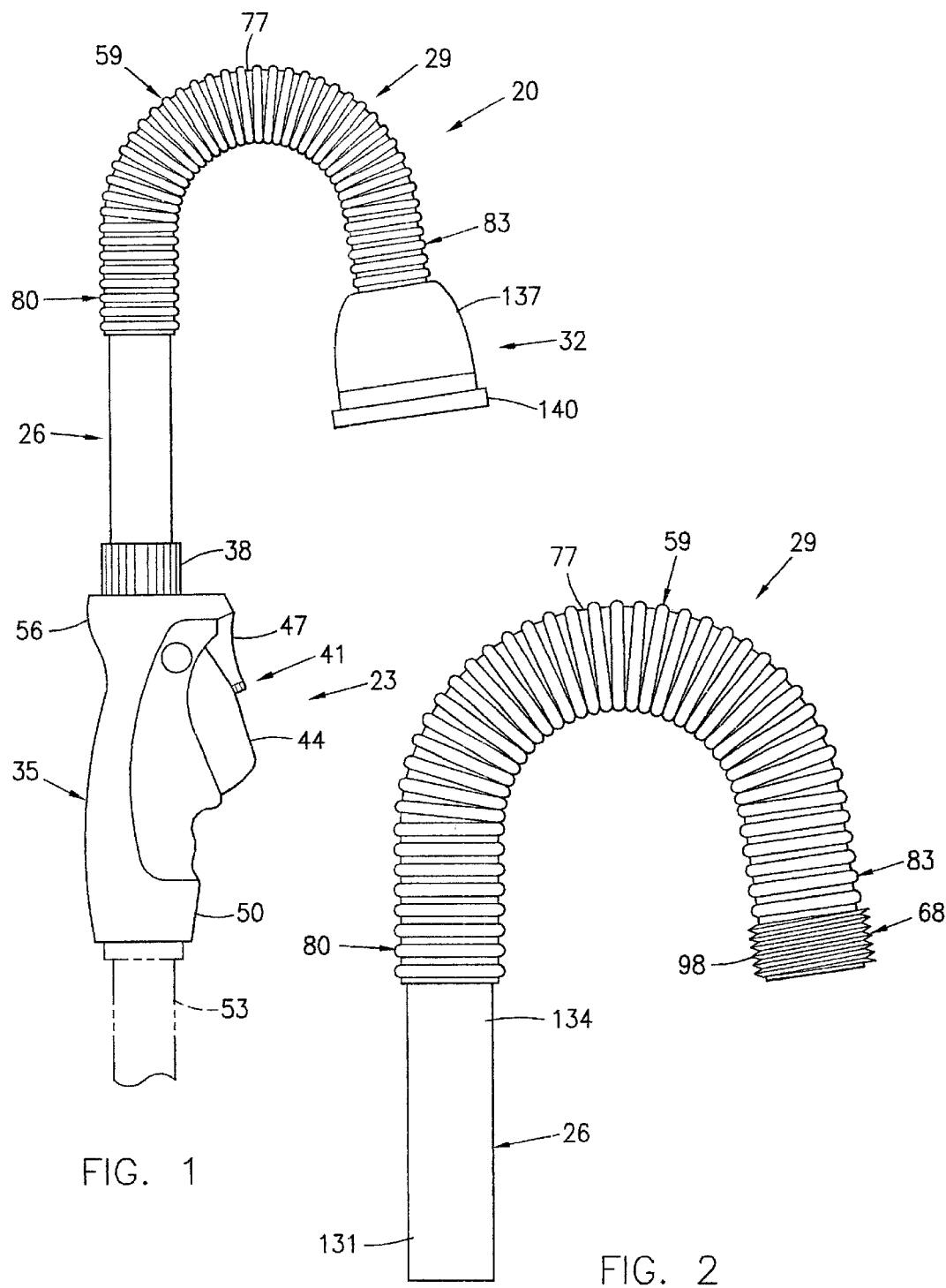

FLEXIBLE LAWN AND GARDEN SPRAY WAND

BACKGROUND OF THE INVENTION

1. Field

Figure 4:
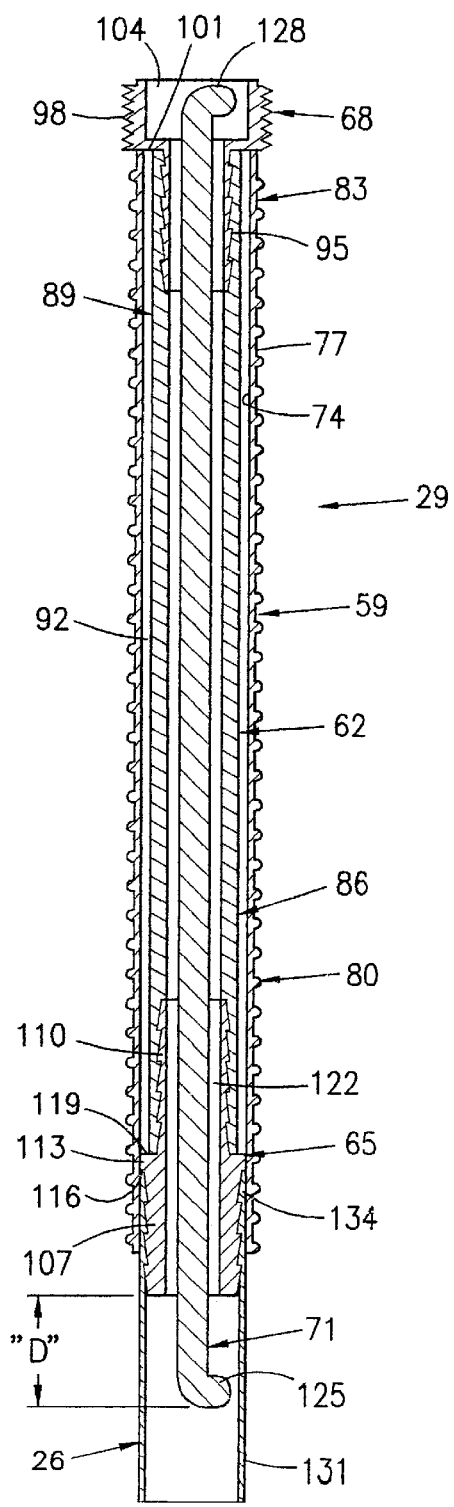

The invention relates to fluid spray devices, and more specifically to water spray wands used for gardening.

2. State of the Art

Water spray wands are used by gardeners to water gardens and lawns. Such spray wands typically connect to the male threaded connector end of a standard garden hose and can include a hand-operable rotary valve, or a rear lever or trigger mechanism to actuate an internal valve which controls the flow of water therefrom. Various removable nozzles can be attached to the same basic spray wand to provide the desired water spray pattern to fit the particular spray application. Some spray wands have trigger mechanisms which permit the flow of water to be infinitely varied from no flow to full flow. Others are merely allow no flow and full flow with no variability therebetween.

There are a number of water spray guns which are of the pistol grip type and rigid type spray wands, such as those disclosed in my co-pending U.S. patent application Ser. No. 09/526,931 the disclosure of which application is hereby incorporated herein by reference, including my invention of a water spray gun with incrementally controllable locking trigger disclosed and claimed therein. Spray wands typically have a rigid extension tube which connects a trigger pistol grip or rotary valve operated grip connectable to a garden hose and to a spray nozzle which is fixedly or removable attached thereto. The extension tube allows a gardener to reach places where a pistol grip sprayer cannot efficiently reach such as overhead planters or the gutters of houses such as for flushing free of leaves. Such extension tubes are typically bent at a thirty degree angle and a ninety degree angle, respectively, to suit such application thereof. A problem arises when the gardener wants to do both tasks and must either use a spray wand which is not suited for one of the tasks or purchase multiple spray wands to do both tasks properly.

There is a need for a spray wand which includes an extension tube which can be positioned at various angles to suit the particular spray application.

SUMMARY OF THE INVENTION

A flexible tube device primarily for use as part of a water spray wand of the type connectable to a garden hose. The wand includes an elongate handle with a water passageway which extends therethrough leading from a lower inlet end thereof, attachable to the garden hose for receiving water, to an upper outlet end thereof connected to a spray nozzle such as a standard single outlet nozzle, rotary multiple outlet nozzle having an inlet portion and an outlet portion. The flexible tube device comprises an elongate, generally tubular body having an inlet end connectable to the outlet end of the handle, and an outlet end for admitting and outletting water from a water passageway which extends therethrough, at least a portion of the tubular body being flexible so as to allow substantial bending thereof without kinking. The wand further includes means for connecting the inlet end of the tubular body to the upper outlet end of the handle and for connecting the outlet end of the tubular body to the spray nozzle such that the tubular body can be bent so as to direct the flow of water exiting the nozzle at a desired angle relative to the handle for ease of use in the particular watering application. The wand can further include a valve such as of the rotary or trigger type operatively connected to the handle for controlling the flow of water through the wand.

The flexible tube device can be of a first embodiment wherein the flexible portion of the body comprises an outer tube which maintains a bent or straight position upon being forced into such position until force is again applied thereto to reposition the flexible outer tube. The outer tube typically comprises at least one elongate piece of thin sheet metal which is spiral wound with side edges thereof movably connected together so as to permit flexing thereof during bending.

The flexible tube device can be of a second embodiment wherein the flexible portion of the body comprises an outer tube, preferably of an externally ribbed configuration with a smooth interior surface, made of a resilient material which does not hold a bent position of itself, but which is held in the desired position by means of an elongate, bendable stiffener member which extends through the body and which retains the shape to which it is bent, thus maintaining the flexible portion in such bent condition.

In either embodiment, the connecting means typically comprises first and second end fittings, the first end fitting which connects the inlet end of the tubular body to the outlet end of the handle and the second end fitting which connects the outlet end of the tubular body to the spray nozzle. The first end fitting typically comprises a tube connecting the inlet end of the tubular body to the upper outlet end of the handle, and the second end fitting comprises a generally tubular fitting having an insertion end for insertion into the outlet end of the tubular body and a threaded connection end which is threadably connected to a correspondingly threaded inlet portion of the nozzle.

In either embodiment, the body typically further includes a flexible inner hose for conducting water through the body, which hose substantially extends through the elongate body from the inlet end to the outlet end thereof, respective inlet and outlet ends of the hose being connected to the upper outlet end of the handle and to the spray nozzle by means of the respective first and second end fittings. In such configuration, the first end fitting comprises a tubular member having an inlet portion and an oppositely extending, tapered externally ribbed outlet portion, the outlet portion which snugly fits within the inlet end of the hose. The first end fitting further comprises a tube having respective inlet and outlet ends, the inlet portion of the tubular member which connects to the outlet of the handle by means of the tube, the inlet end of the tube being connectable to the handle, and the outlet end thereof into which is pressfit the inlet portion of the tubular member. The second end fitting has an externally threaded portion and a tapered externally ribbed portion, the ribbed portion which snugly fits within the outlet end of the hose, and the externally threaded portion thereof being threadably connectable to a correspondingly internally threaded inlet of the spray nozzle.

THE DRAWINGS

Figure 3:
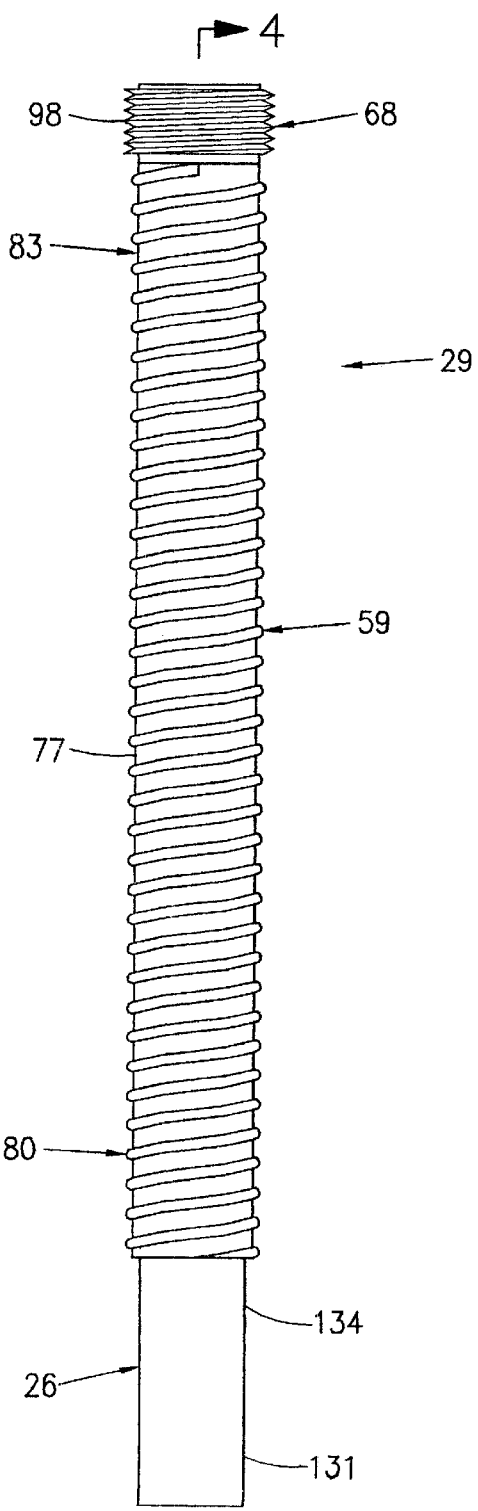
Figure 5:
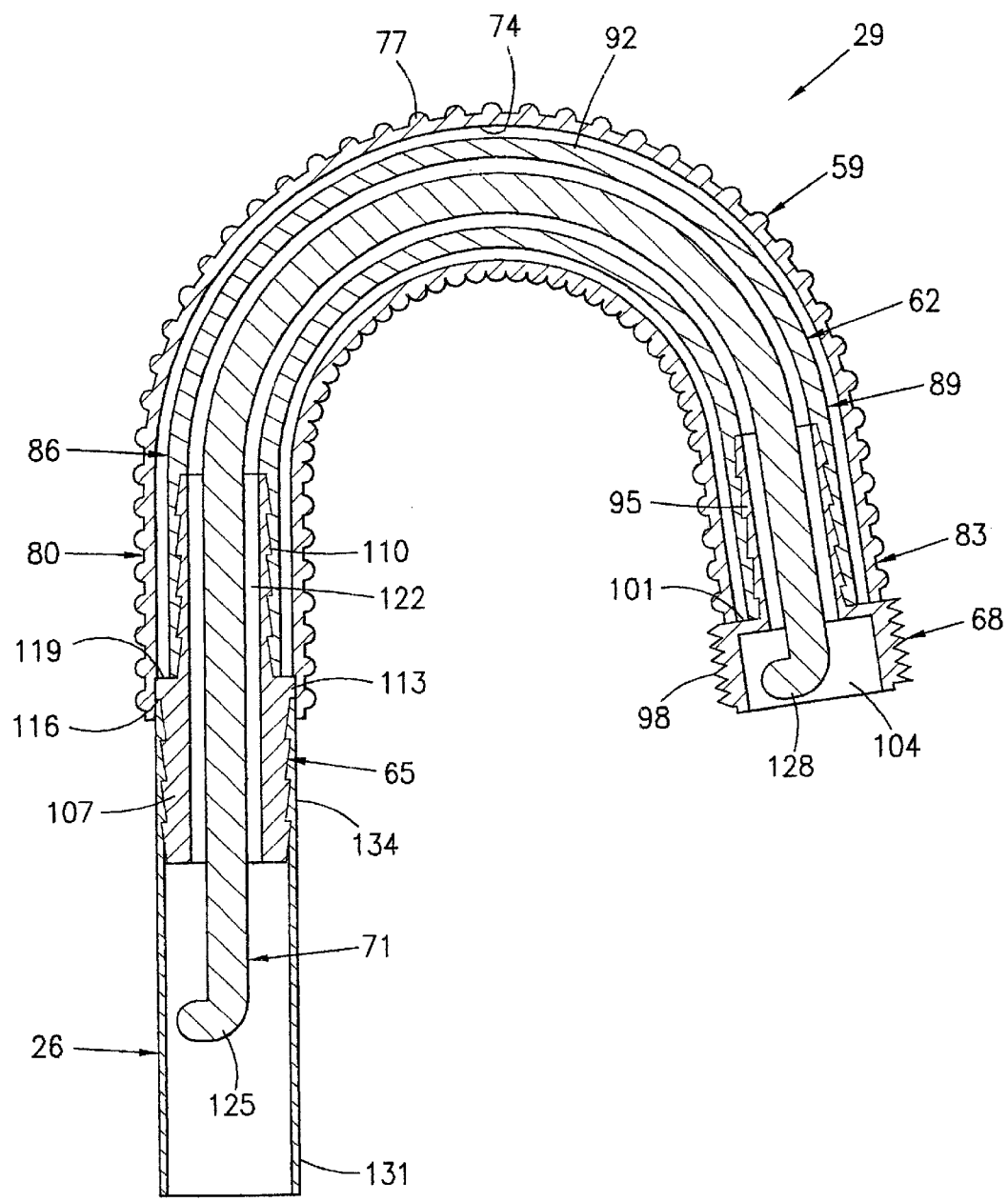

The best mode presently contemplated for carrying out the invention is illustrated in the accompanying drawings, in which:

FIG. 1 is a side elevational view of the flexible tube device of the invention as part of a locking trigger type flexible spray wand;

FIG. 2, a side elevational view of the flexible tube device in a curved position;

FIG. 3, a side elevational view of the flexible tube device in a straightened position;

FIG. 4, a longitudinal vertical sectional view taken on the line 4—4 of FIG. 3 showing the internal construction of the flexible tube device; and FIG. 5, a longitudinal vertical sectional view corresponding to FIG. 4 but with the flexible tube device in the curved position corresponding to FIGS. 1 and 2.

DETAILED DESCRIPTION OF THE ILLUSTRATED EMBODIMENTS

Referring to FIG. 1, therein is shown a flexible spray wand 20, comprising a trigger grip assembly 23, a rigid tube 26, a flexible tube device 29 of the invention, and standard-type nozzle 32.

Trigger grip assembly 23 is of the general type described in my co-pending U.S. patent application Ser. No. 09/526,931 being slightly modified for use as a spray wand rather than a pistol grip spray gun. Trigger grip assembly 23 comprises a housing 35, a closed-biased valve assembly (not shown), a locking screw cap assembly 38, and an incrementally controllable, lockable trigger mechanism 41 which includes a spring biased trigger 44, and a spring biased trigger lock 47. A water passageway (not shown) extends from a lower garden hose attachment portion 50 of housing 35 which is internally threaded for attachment of a standard-type garden hose 53, to an upper flexible tube assembly attachment portion 56 thereof which is externally threaded (not shown) for attaching rigid tube 26 thereto by means of locking screw cap assembly 38 which seals rigid tube 26 to housing 35. Trigger 44 actuates the closed-biased valve assembly to allow water to flow through housing 35, rigid tube 26, flexible tube device 29, and out through nozzle 32.

Flexible tube assembly 29 comprises a flexible ribbed tube 59 made such as of soft plastic or rubber, a flexible hose 62 also made of such material such as soft plastic or rubber, a double barbed end inlet fitting 65, a barbed end outlet fitting 68, and a bendably formable stiffener rod 71. Ribbed tube 59 includes a generally smooth interior surface 74, a ribbed outer surface 77, with opposite inlet and outlet end portions 80 and 83. This allows ribbed tube 59 to bend more than one-hundred-eighty-degrees with hose 62 supporting interior surface 74 to help prevent kinking thereof. Hose 62 includes opposite inlet and outlet end portions 86 and 89, being made of rubber or other such bendable, water conduit material which can be of the type which is reinforced with internal wound cords (not shown), which fits within ribbed tube 59 with a slight annular space 92 therebetween to allow free flexing of ribbed tube 59 thereabout without binding. Ribbed tube 59 can alternatively be made of thin aluminum sheet metal tubing of the type having a generally smooth interior surface 74, a spiral ribbed outer surface 77, with opposite inlet and outlet end portions 80 and 83, or of a spiral wound thin metal which is movably connected along respective side edges thereof.

Outlet fitting 68 comprises an externally barbed portion 95 and an externally threaded portion 98 with an annular shoulder 101 therebetween, outlet fitting 68 having a water passageway 104 which extends longitudinally therethrough. Barbed portion 95 fits snugly within outlet end portion 89 of hose 62, with annular shoulder 101 which abuts outlet end portion 83 of ribbed tube 59 and which can be affixed thereto such as by silver soldering or adhesives. Barbed portion 95 of outlet fitting 68 can be adhesively affixed within outlet end portion 89 of hose 62 for added security.

Inlet fitting 65 comprises a pair of externally barbed portions 107 and 110 connected by an integral annular ring portion 113 so as to form a pair of annular shoulders 116 and 119 therebetween, and with a water passageway 122 which extends longitudinally therethrough. Barbed portion 110 fits snugly into inlet end portion 86 of hose 62, with annular shoulder 119 which abuts inlet end portion 86 of hose 62, and which can be adhesively affixed within inlet end portion 86 of hose 62 for added security.

Stiffener rod 71, which is made of aluminum, copper, or other such bendable, generally non-corroding material which retains a position once bent, includes an inlet end portion 125 and an outlet end portion 128 which are bent ninety degrees so as to be retained in place extending through inlet fitting 65, hose 62, ribbed tube 59, and outlet fitting 68. One of end portions 125 and 128 is bent after assembly extending a distance "D" beyond inlet fitting 65 to allow for flexing of tube device 29.

Rigid tube 26, which is made of aluminum, stainless steel, brass, other such non-corroding, generally rigid material, includes an inlet end portion 131 and an outlet end portion 134. Outlet portion 134 of rigid tube 26 pressfits over externally barbed portion 107 of inlet fitting 65 abutting annular shoulder 116 of ring portion 113 thereof, and simultaneously snugly fits within inlet end portion 80 of ribbed tube 59 so as to be retained thereto.

Nozzle 32 is one of any number of nozzle types which can be used, comprising a tapered outer shell 137, a rotary selector 140, and an internal valve mechanism (not shown). Rotary selector 140 includes a plurality of nozzles (not shown) which can be selectively engaged to emit the desired type of spray of water from concentrated to diffused. A non-rotary nozzle (not shown) can also be used which emits only a single type of spray pattern, or a rotary variable spray type spray nozzle such as used on many pistol grip sprayers. Nozzle 32 screwably connects to externally threaded portion 98 of outlet fitting 68 by means of mating internal threads (not shown).

Many variations of the flexible tube device are possible while staying within the same inventive concept. For example, other types of flexible outer tubes can be used such as a series of interconnected members or other such flexible outer covering, those metal and plastic types used to direct fluids during machining operations such as on a lathe, and the like. If such outer covering is not water-tight, then the hose or other such water conduit interior thereto is used to convey the water.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A water spray wand of the type connectable to a garden hose, comprising:

an elongate handle having a water passageway which extends therethrough leading from an inlet end thereof, attachable to the garden hose for receiving water, to an outlet end thereof for outletting water, said inlet end including a user operated valve for user control of the flow of water from the garden hose through the water passageway therethrough;

an elongate, generally tubular body having an inlet end connectable to said outlet end of said handle, and an outlet end for outletting water from a water passageway which extends therethrough, at least a portion of said tubular body being flexible so as to allow substantial bending thereof without substantial kinking;

a flexible hose for conducting water through the tubular body, said hose extending substantially through said tubular body from the inlet end to the outlet end thereof;

a spray nozzle having an inlet portion and an outlet portion;

a first end fitting which connects the inlet end of said tubular body to said outlet end of said handle, said first end fitting comprising a generally tubular body and a tubular, tapered, externally ribbed portion, said tubular body having a free end connectable to the outlet end of the handle and said ribbed portion snugly fitting within the inlet end of the hose;

a second end fitting which connects the outlet end of said tubular body to said spray nozzle, said second end fitting comprising an externally threaded portion and a tapered externally ribbed portion, said ribbed portion fitting snugly within the outlet end of said hose, and said externally threaded portion thereof being threadably connectable to a correspondingly internally threaded inlet of the spray nozzle; and wherein the flexible portion of the tubular body can be bent so as to direct the flow of water exiting the nozzle at a desired angle relative to the handle to suit the particular water application, and the flexible portion of the tubular body will substantially maintain a bent or straight position upon being forced into such position until force is again applied thereto to reposition said flexible portion of the tubular body.

2. A water spray wand according to claim 1, wherein the first end fitting further comprises a tube having respective inlet and outlet ends, wherein the inlet portion of the tubular member is connectable to the outlet end of the handle by means of said tube, said inlet end of said tube which is connectable to the handle, and said outlet end thereof into which is pressfit said inlet portion of said tubular member.

3. A water spray wand of the type connectable to a garden hose, comprising:

an elongate handle having a water passageway which extends therethrough leading from an inlet end thereof, attachable to the garden hose for receiving water, to an outlet end thereof for outletting water, said inlet end including a user operated valve for user control of the flow of water from the garden hose through the water passageway therethrough;

an elongate, generally tubular body having an inlet end connectable to said outlet end of said handle, and an outlet end for outletting water from a water passageway which extends therethrough, at least a portion of said tubular body being flexible so as to allow substantial bending thereof without substantial kinking, and wherein said flexible portion of the tubular body includes a flexible outer tube having a ribbed outer surface and a smooth interior surface;

a spray nozzle having an inlet portion and an outlet portion;

a first end fitting which connects the inlet end of the tubular body to the outlet end of the handle;

a second end fitting which connects the outlet end of said tubular body to the spray nozzle;

an elongate, bendable stiffener member which substantially retains a shape to which it is bent;

wherein said tubular body can be bent so as to direct the flow of water exiting the nozzle at a desired angle relative to the handle to suit the particular water application, and wherein said bendable stiffener member substantially maintains said flexible portion of said tubular body in a bent or straight position upon being forced into such position until force is again applied thereto to reposition said flexible outer tube.

4. A water spray wand of the type connectable to a garden hose, comprising:

an elongate handle having a water passageway which extends therethrough leading from an inlet end thereof, attachable to the garden hose for receiving water, to an outlet end thereof for outletting water, said inlet end including a user operated valve for user control of the flow of water from the garden hose through the water passageway therethrough;

an elongate, generally tubular body having an inlet end connectable to said outlet end of said handle, and an outlet end for outletting water from a water passageway which extends therethrough, at least a portion of said tubular body being flexible and made of at least one elongate piece of thin sheet metal which is spiral wound with side edges thereof movably connected together so as to permit flexing thereof during bending s o as to allow substantial bending thereof without substantial kinking;

a spray nozzle having an inlet portion and an outlet portion;

a first end fitting which connects the inlet end of said tubular body to said outlet end of said handle;

a second end fitting which connects the outlet end of said tubular body to said spray nozzle; and wherein the flexible portion of the tubular body can be bent so as to direct the flow of water exiting the nozzle at a desired angle relative to the handle to suit the particular water application, and the flexible portion of the tubular body will substantially maintain a bent or straight position upon being forced into such position until force is again applied thereto to reposition said flexible portion of the tubular body.

5. A water spray wand of the type connectable to a garden hose, comprising:

an elongate handle having a water passageway which extends therethrough leading, from an inlet end thereof, attachable to the garden hose for receiving water, to an outlet end thereof for outletting water, said inlet end including a user operated valve for user control of the flow of water from the garden hose through the water passageway therethrough;

an elongate, generally tubular body having an inlet end connectable to said outlet end of said handle, and an outlet end for outletting water from a water passageway which extends therethrough, at least a portion of said tubular body being flexible so as to allow substantial bending thereof without substantial kinking, and wherein said flexible portion of the tubular body includes a flexible outer tube;

a spray nozzle having an inlet portion and an outlet portion;

a first end fitting which connects the inlet end of the tubular body to the outlet end of the handle;

a second end fitting which connects the outlet end of said tubular body to the spray nozzle;

a flexible hose for conducting water through the tubular body, which hose substantially extends through said tubular body from the inlet end to the outlet end thereof, respective inlet and outlet ends of said hose being connectable through the first end fitting to the upper outlet end of the handle and through the second end fitting to the spray nozzle an elongate, bendable stiffener member extending through the flexible hose beyond the respective inlet and outlet ends of the hose and which substantially retains a shape to which it is bent; and wherein said tubular body can be bent so as to direct the flow of water exiting the nozzle at a desired angle relative to the handle to suit the particular water application, and wherein said bendable stiffener member substantially maintains said flexible portion of said tubular body in a bent or straight position upon being forced into such position until force is again applied thereto to reposition said flexible outer tube.

6. A water spray wand of the type connectable to a garden hose, comprising:

an elongate handle having a water passageway which extends therethrough leading from an inlet end thereof, attachable to the garden hose for receiving water, to an outlet end thereof for outletting water, said inlet end including a user operated valve for user control of the flow of water from the garden hose through the water passageway therethrough;

an elongate, generally tubular body having an inlet end connectable to said outlet end of said handle, and an outlet end for outletting water from a water passageway which extends therethrough, at least a portion of said tubular body being flexible so as to allow substantial bending thereof without substantial kinkling, and wherein said flexible portion of the tubular body includes a flexible outer tube;

a spray nozzle having an inlet portion and an outlet portion;

a first end fitting which connects the inlet end of the tubular body to the outlet end of the handle;

a second end fitting which connects the outlet end of said tubular body to the spray nozzle;

an elongate, bendable stiffener member extending through the tubular body beyond the inlet and outlet ends of the tubular body and which substantially retains a shape to which it is bent;

wherein said tubular body can be bent so as to direct the flow of water exiting the nozzle at a desired angle relative to the handle to suit the particular water application, and wherein said bendable stiffener member substantially maintains said flexible portion of said tubular body in a bent or straight position upon being forced into such position until force is again applied thereto to reposition said flexible outer tube.

7. A water spray wand according to claim 6, wherein the user operated valve is a trigger valve operated by operation of a trigger and wherein the elongate handle is held by a user holding a portion of the elongate handle in a manner to operate the trigger of the trigger valve.

8. A water spray wand according to claim 7, therein a hand receiving area of the elongate handle around the trigger is configured to receive the hand of a user in holding the elongate handle and in position to operate the trigger.

9. A water spray wand according to claim 8, wherein the hand receiving area is at the inlet end of the elongate handle.

* * * * *